US008155519B2

(12) United States Patent
Sheth et al.

(10) Patent No.: US 8,155,519 B2
(45) Date of Patent: *Apr. 10, 2012

(54) FLEXIBLE, DENSE LINE CARD ARCHITECTURE

(75) Inventors: Samir Satish Sheth, Dallas, TX (US); Marvin R. Young, Richardson, TX (US); Jeffrey Lloyd Cox, Fairview, TX (US); John W. Ayres, III, Forney, TX (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,617

(22) Filed: Apr. 21, 2010

(65) Prior Publication Data

US 2010/0241913 A1    Sep. 23, 2010

Related U.S. Application Data

(62) Division of application No. 10/455,774, filed on Jun. 4, 2003, now Pat. No. 7,729,617.

(60) Provisional application No. 60/385,946, filed on Jun. 4, 2002.

(51) Int. Cl.
*H04B 10/08* (2006.01)

(52) U.S. Cl. .............. 398/27; 398/33; 398/38; 398/79; 398/135; 398/164; 714/704; 714/786; 385/89; 385/90; 385/92; 385/93; 370/465; 370/545; 370/907; 370/535

(58) Field of Classification Search ............ 398/135, 398/79, 164, 136, 41, 42, 138, 25, 26, 27, 398/33, 38, 177, 181, 182, 183, 192, 195, 398/196, 197, 202, 208, 209, 137, 163, 139, 398/9, 10, 11, 14, 16, 17, 18, 22, 23, 24, 398/29, 30; 714/704, 786, 752; 385/88, 89, 385/90, 92, 93; 370/465, 545, 907, 535, 252, 370/536, 537, 445

See application file for complete search history.

(56) References Cited

U.S. PATENT DOCUMENTS

| 4,229,831 A | 10/1980 | Lacher |
| 4,535,459 A | 8/1985 | Hogge, Jr. |
| 4,636,859 A | 1/1987 | Vernhet et al. |
| 4,710,022 A | 12/1987 | Soeda et al. |
| 5,224,183 A | 6/1993 | Dugan |
| 5,225,922 A | 7/1993 | Chraplyvy et al. |

(Continued)

FOREIGN PATENT DOCUMENTS

EP    1 191 756    3/2002

(Continued)

OTHER PUBLICATIONS

International Patent Application No. PCT/US03/18130: International Search Report dated Sep. 15, 2003, 1 pages.

*Primary Examiner* — Hanh Phan
(74) *Attorney, Agent, or Firm* — Woodcock Washburn LLP

(57) ABSTRACT

The disclosure relates to optical fiber transmission systems, and in particular, pertains to the transceiver cards in an optical fiber transport system. In particular the disclosure teaches an improved transceiver card architecture that allows high density, flexibility and interchangeability of functionality.

17 Claims, 9 Drawing Sheets

Ch. 1 Tributary Module and
MSA Tributary Optics

U.S. PATENT DOCUMENTS

| | | |
|---|---|---|
| 5,267,071 A | 11/1993 | Little et al. |
| 5,299,048 A | 3/1994 | Suyama |
| 5,321,541 A | 6/1994 | Cohen |
| 5,455,703 A | 10/1995 | Duncan et al. |
| 5,559,625 A | 9/1996 | Smith et al. |
| 5,613,210 A | 3/1997 | Van Driel et al. |
| 5,726,784 A | 3/1998 | Alexander et al. |
| 5,778,116 A | 7/1998 | Tomich |
| 5,790,285 A | 8/1998 | Mock |
| 5,812,290 A | 9/1998 | Maeno et al. |
| 5,825,949 A | 10/1998 | Choy et al. |
| 5,877,881 A | 3/1999 | Miyauchi et al. |
| 5,903,613 A | 5/1999 | Ishida |
| 5,914,794 A | 6/1999 | Fee |
| 5,914,799 A | 6/1999 | Tan |
| 5,936,753 A | 8/1999 | Ishikawa |
| 5,940,209 A | 8/1999 | Nguyen |
| 5,963,350 A | 10/1999 | Hill |
| 5,995,694 A | 11/1999 | Akasaka et al. |
| 6,005,702 A | 12/1999 | Suzuki et al. |
| 6,021,245 A | 2/2000 | Berger et al. |
| 6,038,062 A | 3/2000 | Kosaka |
| 6,075,634 A | 6/2000 | Casper et al. |
| 6,078,414 A | 6/2000 | Iwano |
| 6,081,360 A | 6/2000 | Ishikawa et al. |
| 6,084,694 A | 7/2000 | Milton et al. |
| 6,088,152 A | 7/2000 | Berger et al. |
| 6,108,074 A | 8/2000 | Bloom |
| 6,122,095 A | 9/2000 | Fatehi |
| 6,151,334 A | 11/2000 | Kim et al. |
| 6,157,477 A | 12/2000 | Robinson |
| 6,160,614 A | 12/2000 | Unno |
| 6,163,392 A | 12/2000 | Condict et al. |
| 6,163,636 A | 12/2000 | Stentz et al. |
| 6,173,094 B1 | 1/2001 | Bowerman et al. |
| 6,177,985 B1 | 1/2001 | Bloom |
| 6,198,559 B1 | 3/2001 | Gehlot |
| 6,226,296 B1 | 5/2001 | Lindsey et al. |
| 6,229,599 B1 | 5/2001 | Galtarossa |
| 6,236,481 B1 | 5/2001 | Laor |
| 6,236,499 B1 | 5/2001 | Berg et al. |
| 6,246,510 B1 | 6/2001 | BuAbbud et al. |
| 6,259,553 B1 | 7/2001 | Kinoshita |
| 6,259,554 B1 | 7/2001 | Shigematsu et al. |
| 6,259,693 B1 | 7/2001 | Ganmukhi et al. |
| 6,259,845 B1 | 7/2001 | Sardesai |
| 6,272,185 B1 | 8/2001 | Brown |
| 6,275,315 B1 | 8/2001 | Park et al. |
| 6,288,811 B1 | 9/2001 | Jiang et al. |
| 6,288,813 B1 | 9/2001 | Kirkpatrick et al. |
| 6,295,281 B1 | 9/2001 | Itkowsky et al. |
| 6,301,340 B1 | 10/2001 | Sansom et al. |
| 6,307,656 B2 | 10/2001 | Terahara |
| 6,317,231 B1 | 11/2001 | Al-Salameh et al. |
| 6,317,255 B1 | 11/2001 | Fatehi et al. |
| 6,323,950 B1 | 11/2001 | Kim et al. |
| 6,327,060 B1 | 12/2001 | Otani et al. |
| 6,356,384 B1 | 3/2002 | Islam |
| 6,359,729 B1 | 3/2002 | Amoruso |
| 6,388,801 B1 | 5/2002 | Sugaya et al. |
| 6,396,853 B1 | 5/2002 | Humphrey et al. |
| 6,430,201 B1 | 8/2002 | Azizoglu et al. |
| 6,519,082 B2 | 2/2003 | Ghera et al. |
| 6,567,413 B1 | 5/2003 | Denton et al. |
| 6,587,236 B1 | 7/2003 | Butler et al. |
| 6,618,176 B2 | 9/2003 | Alexander et al. |
| 6,654,383 B2 | 11/2003 | Haymes et al. |
| 6,678,527 B1 | 1/2004 | Rasanen |
| 6,775,799 B1 | 8/2004 | Giorgetta et al. |
| 6,782,009 B1 | 8/2004 | Giorgetta et al. |
| 6,788,681 B1 | 9/2004 | Hurren et al. |
| 6,832,052 B1 | 12/2004 | Marmur |
| 6,895,190 B1 | 5/2005 | Neumann et al. |
| 6,904,237 B2 | 6/2005 | Rasztovits-Wiech et al. |
| 6,915,036 B2 | 7/2005 | Bhalla et al. |
| 6,952,534 B1 | 10/2005 | Sikora |
| 6,975,642 B2 | 12/2005 | Levinson et al. |
| 6,996,123 B1 | 2/2006 | Jiang et al. |
| 7,039,067 B2 | 5/2006 | Feinberg et al. |
| 7,073,117 B1 * | 7/2006 | Ireland et al. ............... 714/786 |
| 7,099,584 B1 | 8/2006 | Narvaez et al. |
| 7,099,592 B2 | 8/2006 | Snawerdt |
| 7,155,130 B2 | 12/2006 | Baeyens et al. |
| 7,164,692 B2 | 1/2007 | Cox et al. |
| 7,167,648 B2 | 1/2007 | Heinz et al. |
| 7,209,667 B2 | 4/2007 | Lindblad |
| 7,242,862 B2 * | 7/2007 | Saunders et al. ............. 398/30 |
| 7,245,633 B1 | 7/2007 | Mueller |
| 7,295,783 B2 | 11/2007 | Singh et al. |
| 7,729,617 B2 * | 6/2010 | Sheth et al. ................. 398/135 |
| 2001/0005271 A1 | 6/2001 | Leclerc et al. |
| 2001/0007605 A1 | 7/2001 | Inagaki et al. |
| 2001/0009468 A1 | 7/2001 | Fee |
| 2001/0014104 A1 | 8/2001 | Bottorff et al. |
| 2002/0009060 A1 | 1/2002 | Gross |
| 2002/0012152 A1 | 1/2002 | Agazzi et al. |
| 2002/0015220 A1 | 2/2002 | Papernyl et al. |
| 2002/0034197 A1 | 3/2002 | Tornetta et al. |
| 2002/0044317 A1 | 4/2002 | Gentner et al. |
| 2002/0044324 A1 | 4/2002 | Hoshida et al. |
| 2002/0048287 A1 | 4/2002 | Silvers |
| 2002/0051468 A1 | 5/2002 | Ofek et al. |
| 2002/0063948 A1 | 5/2002 | Islam et al. |
| 2002/0064181 A1 | 5/2002 | Ofek et al. |
| 2002/0075903 A1 | 6/2002 | Hind |
| 2002/0080809 A1 | 6/2002 | Nicholson et al. |
| 2002/0114047 A1 | 8/2002 | McBrien et al. |
| 2002/0131115 A1 | 9/2002 | Kasahara |
| 2002/0141013 A1 | 10/2002 | Patel et al. |
| 2003/0002118 A1 | 1/2003 | Givehchi |
| 2003/0043432 A1 | 3/2003 | Marmur et al. |
| 2003/0067655 A1 | 4/2003 | Pedersen et al. |
| 2003/0161351 A1 | 8/2003 | Beverly et al. |
| 2004/0109465 A1 | 6/2004 | Kim et al. |
| 2006/0002419 A1 | 1/2006 | Cox et al. |

FOREIGN PATENT DOCUMENTS

| | | |
|---|---|---|
| JP | 01115230 | 5/1989 |
| JP | 02238736 | 9/1990 |

* cited by examiner

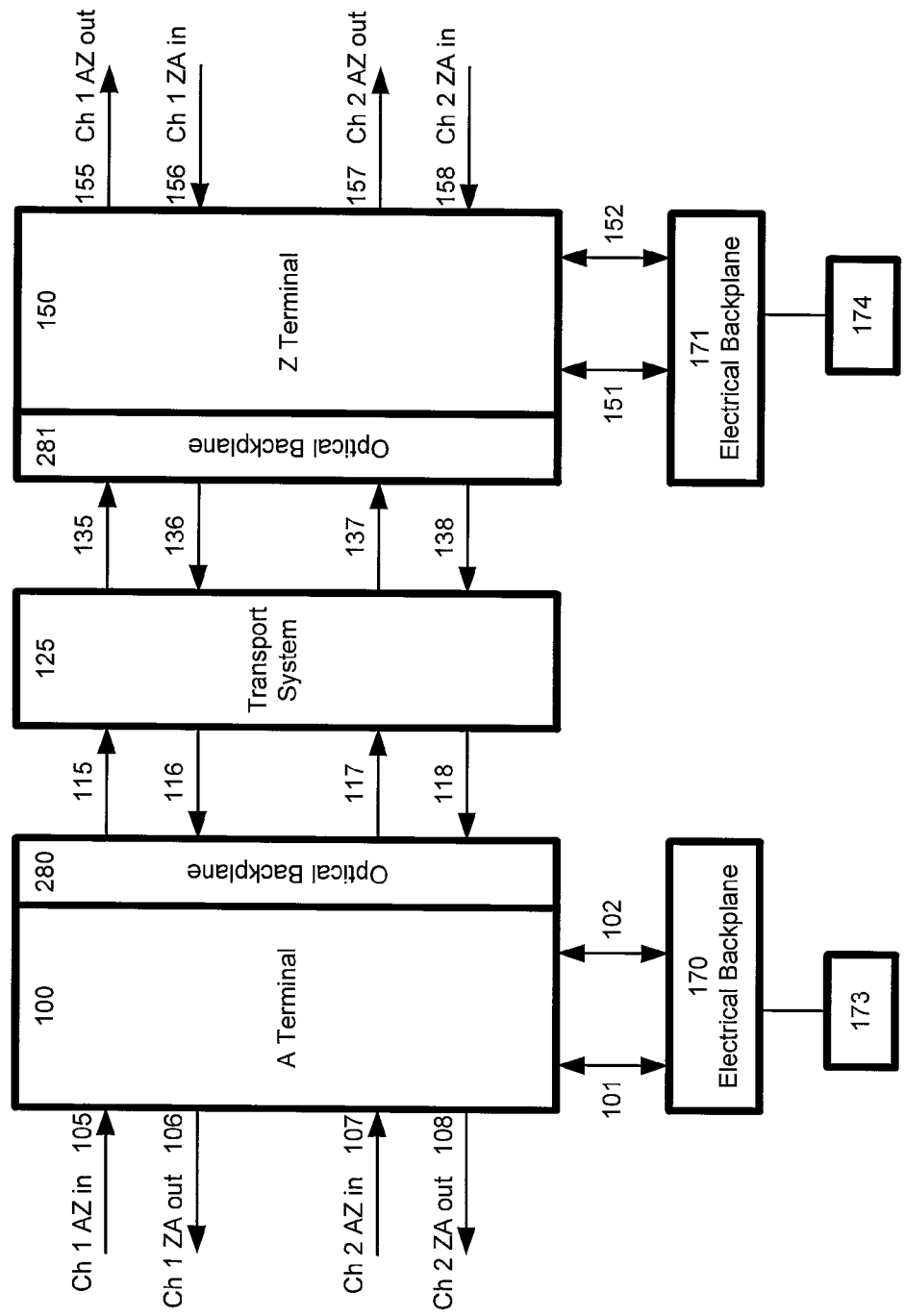
FIGURE 1: Line Cards in Transport System

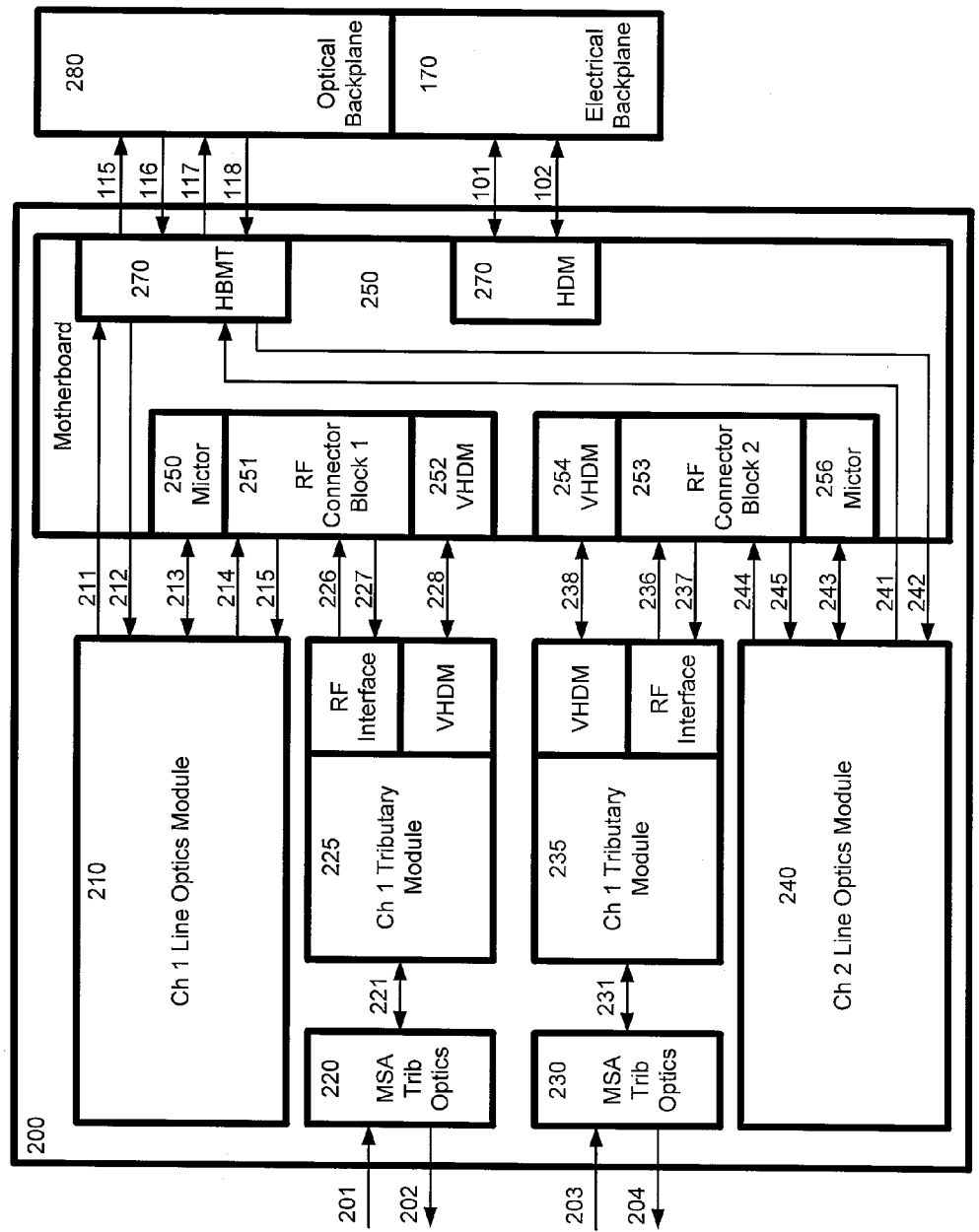
FIGURE 2: Line Cards Modules

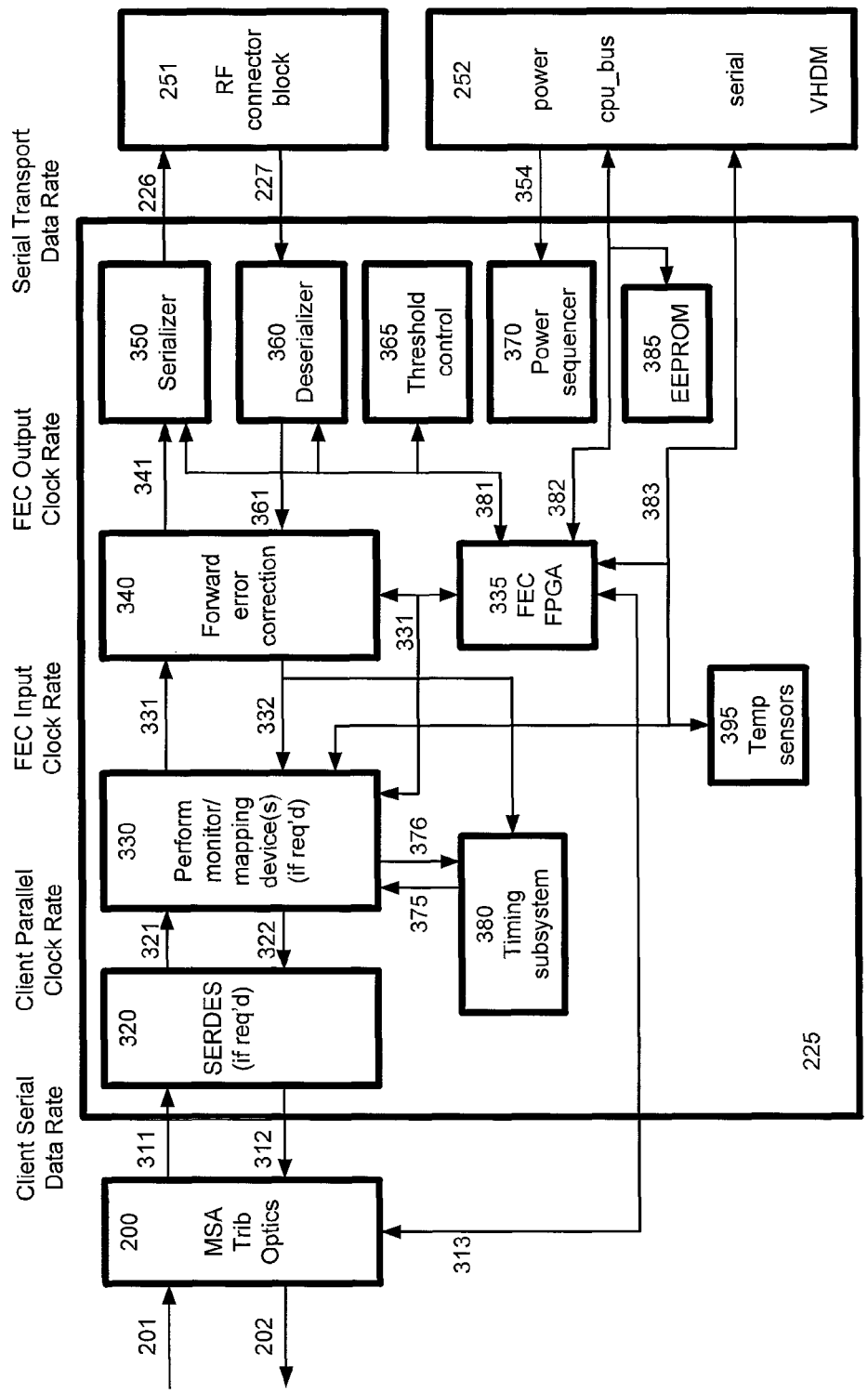
FIGURE 3: Ch. 1 Tributary Module and MSA Tributary Optics

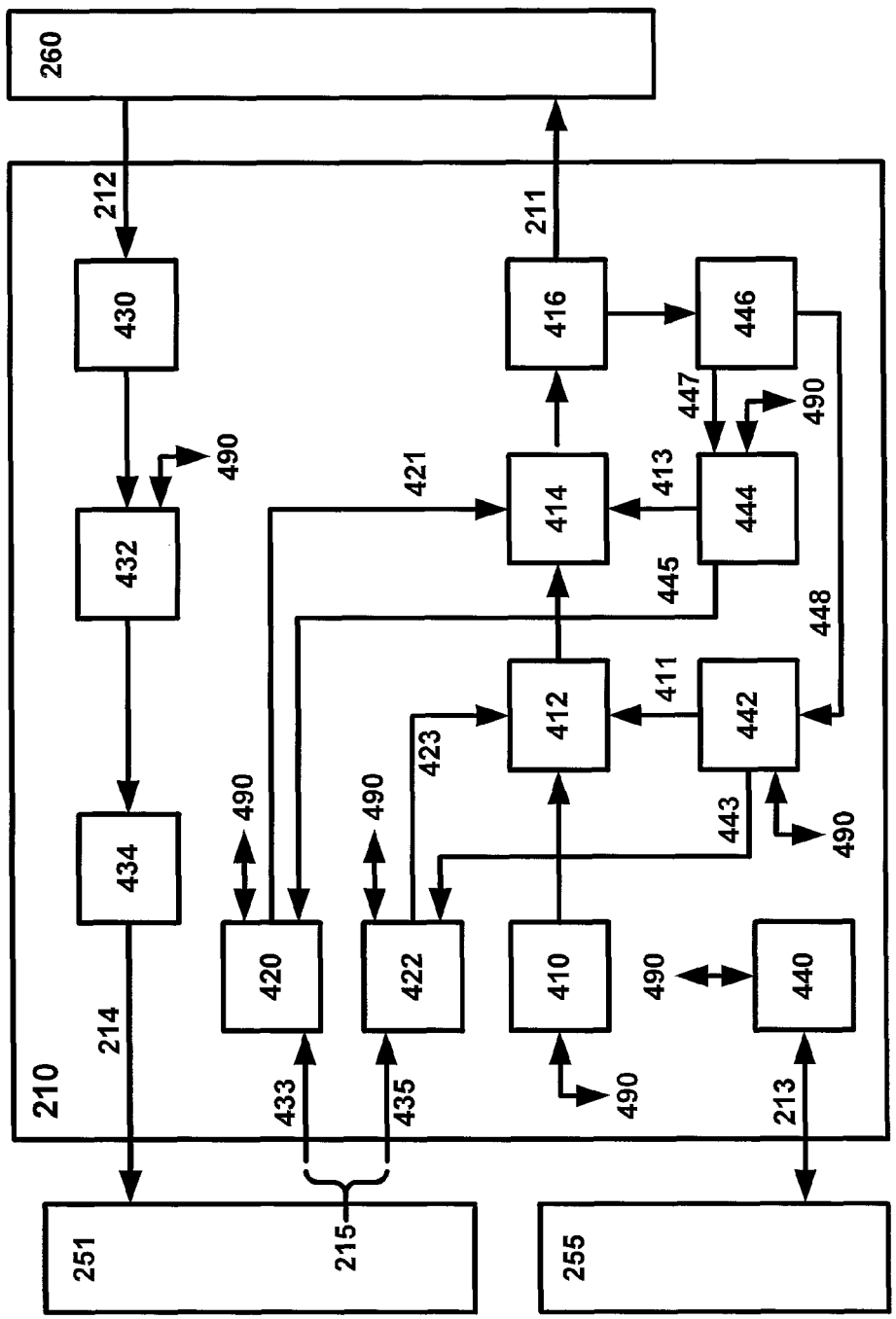
FIGURE 4: Line Optics Module

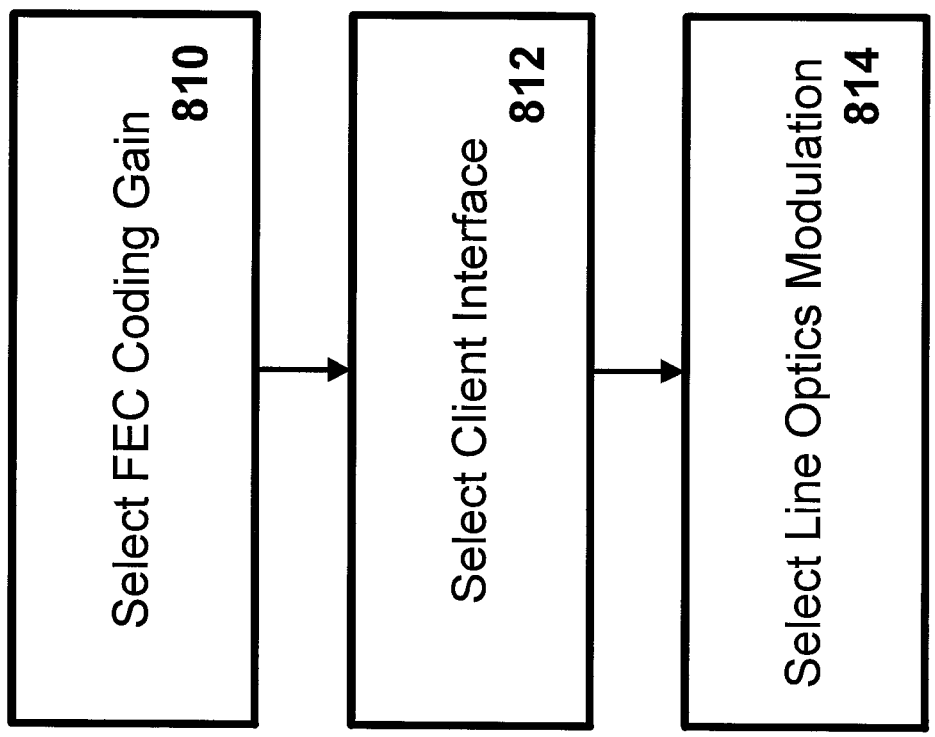
FIGURE 5: Feature Selection Flowchart

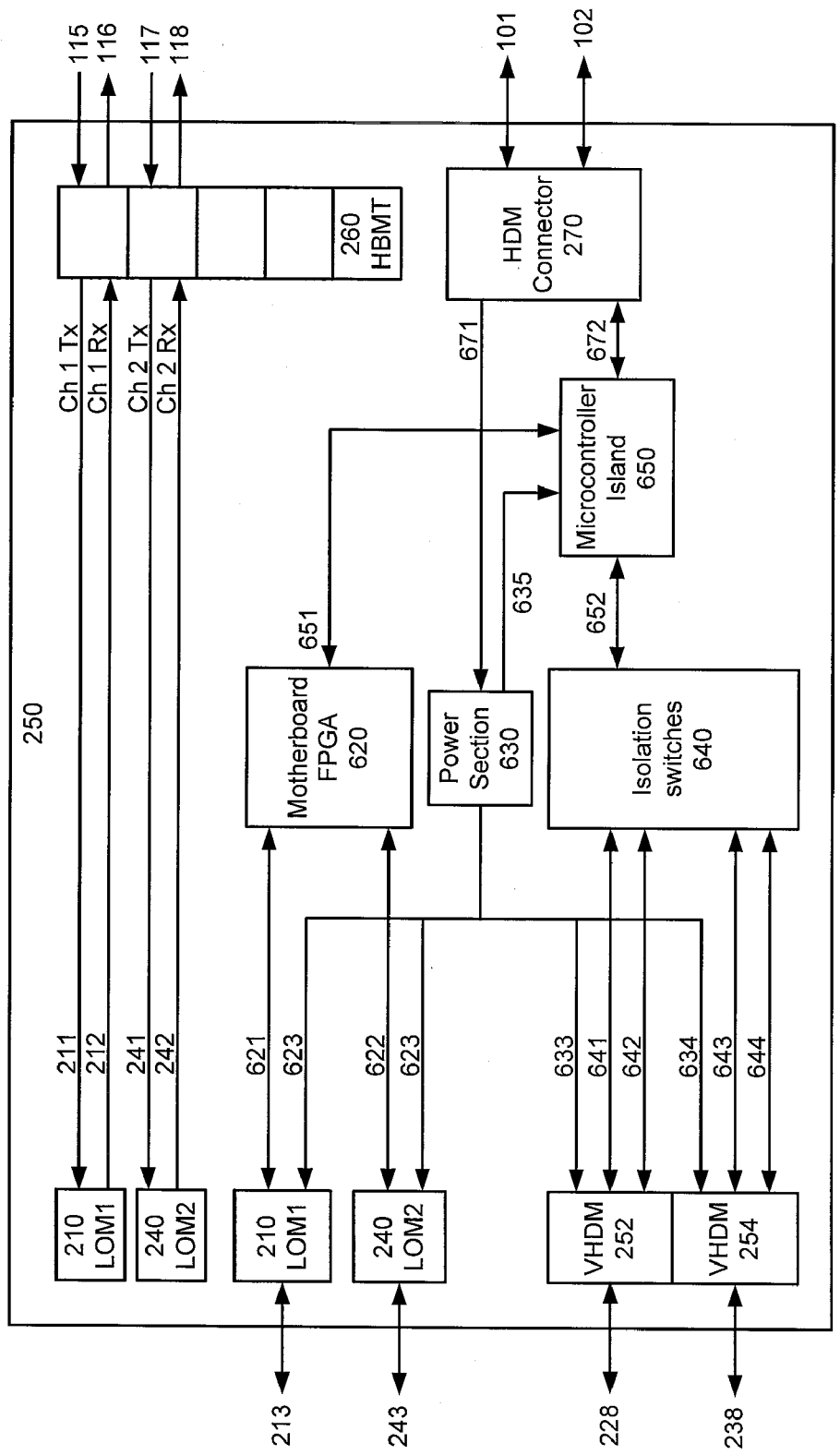
FIGURE 6: Motherboard Module

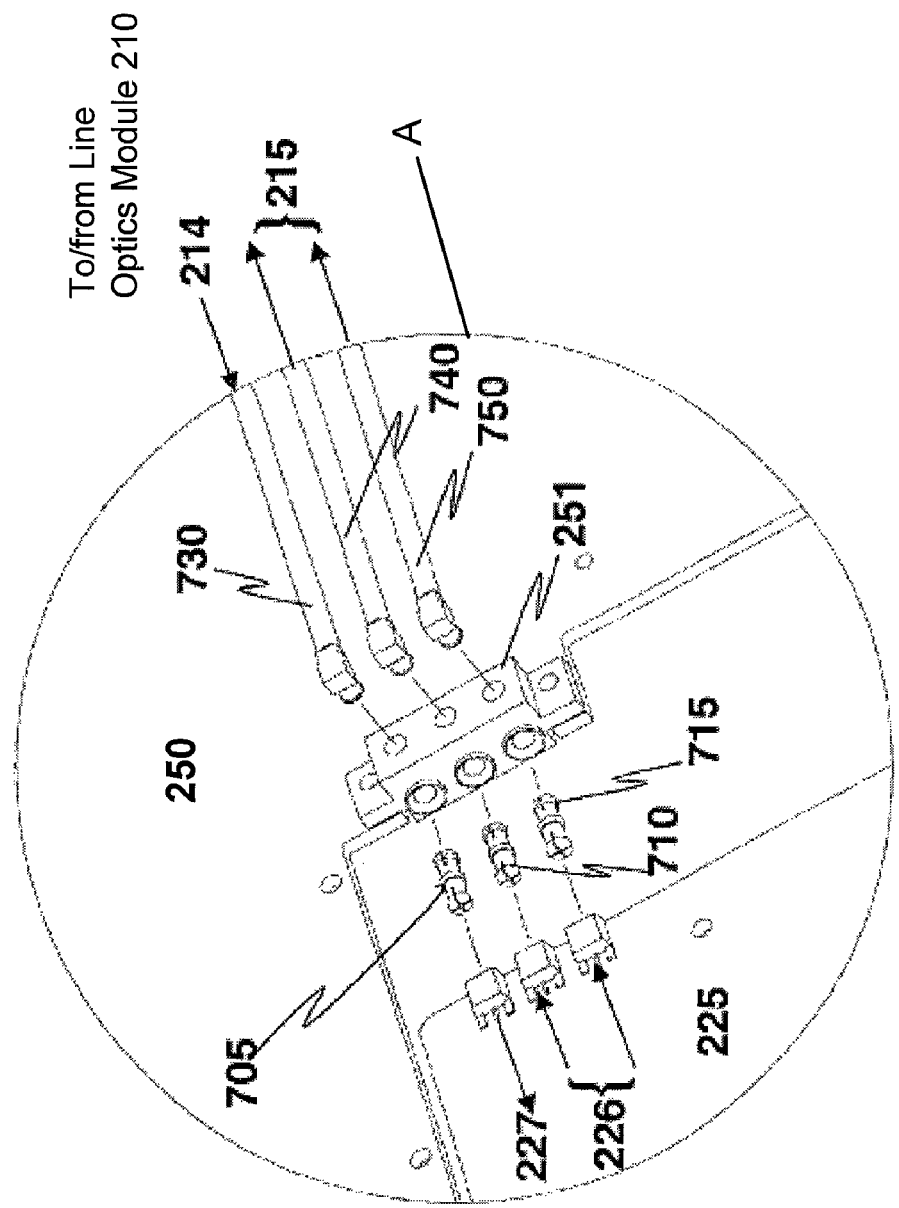
FIGURE 7A: RF Connector Block

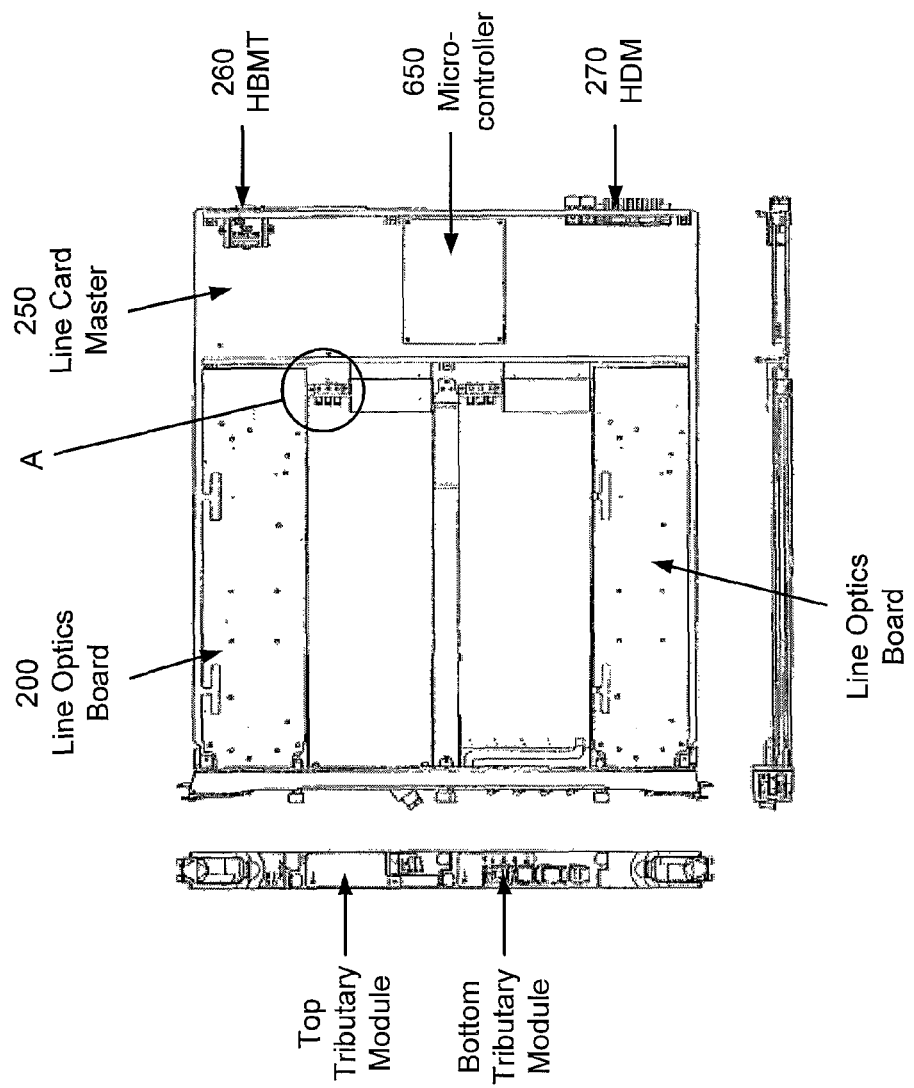
FIGURE 7B: Line Card

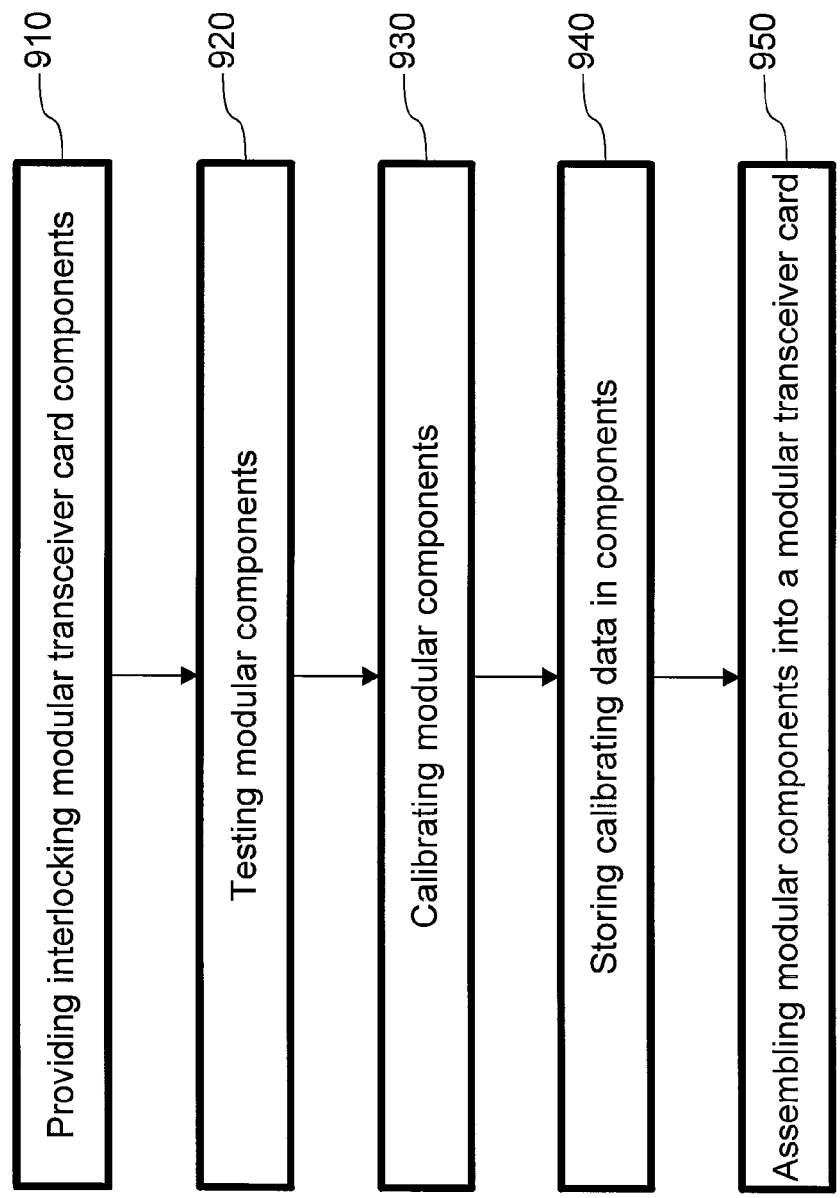

FLEXIBLE, DENSE LINE CARD ARCHITECTURE

CROSS-REFERENCE TO RELATED APPLICATIONS

This application is a divisional of U.S. application Ser. No. 10/455,774 entitled "Flexible, Dense Line Card Architecture", filed Jun. 4, 2003 which claims the benefit of U.S. Provisional Application No. 60/385,946 entitled "Line Card Architecture", filed Jun. 4, 2002, both of which are herein incorporated by reference in their entireties.

TECHNICAL FIELD

The invention is relevant to optical fiber transmission systems, and in particular, pertains to the transceiver cards in an optical fiber transport system. In particular the invention teaches an improved transceiver card architecture that allows high density, flexibility and interchangeability of functionality.

BACKGROUND

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 10 Gbps (gigabit per second) channels across distances of 1000 to 6000 km in a single 30 nm spectral band. A duplex optical transport system is one in which traffic is both transmitted and received between parties at opposite end of the link. In current DWDM long haul transport systems transmitters different channels operating at distinct carrier frequencies are multiplexed using a multiplexer. Such multiplexers may be implemented using array waveguide (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using array waveguide (AWG) technology or thin film technology, or a variety of other technologies. Each channel is then optically coupled to separate optical receivers. The optical receiver is typically comprised of a semiconductor photodetector and accompanying electronics.

The total link distance may in today's optical transport systems be two different cities separated by continental distances, from 1000 km to 6000 km, for example. To successfully bridge these distances with sufficient optical signal power relative to noise, the total fiber distance is separated into fiber spans, and the optical signal is periodically amplified using an in-line optical amplifier after each fiber span. Typical fiber span distances between optical amplifiers are 50-100 km. Thus, for example, 30 100 km spans would be used to transmit optical signals between points 3000 km apart. Examples of in-line optical amplifiers include erbium doped fiber amplifiers (EDFAs) and semiconductor optical amplifiers (SOAs).

The architecture of current optical transport systems comprise a high degree of specialization. For example, the receiver line card is often separated from the transmitter line card so that the two cards are required at each terminal to achieve one channel of duplex operation. This configuration is inefficient in its use of space, power and logistical operation, and there is a need for an integrated line card with high density.

A further limitation in the current art is the inflexibility of current transceiver cards. For example, in the current art, a transceiver card that supports the SONET standard, cannot support the Ethernet standard. Further, in the current art, a transceiver card that supports 4 OC48 SONET signals cannot support an OC192 SONET signals despite the fact that both of these signals have the same aggregate data rate of approximately 10 Gbps. There is, consequently, a need for a transceiver line card that is flexible to operate at different standards.

A further limitation in the current art is the inflexibility of current transceiver cards to support different Forward Error Correction (FEC) standards. For example, in the current art, a transceiver card that supports a G.709 FEC with 7% overhead cannot support an extended FEC with 25% overhead. There is, consequently, a need for a transceiver line card that is flexible to support different FEC standards.

Another limitation in the current art is the inflexibility of current transceiver cards to support different optical performances and capabilities. For example, a transceiver card that could be upgraded from the field to incorporate a tunable laser and be re-used in another location is not currently possible in the art. Furthermore, the mixing and matching of different optical reach performances (and associated costs) in the same systems is desirable by the industry but not available in the art of DWDM long haul transport systems. From a competitive perspective, the technology of the line optics portion of transceiver cards is often a critical driver to an optical transport system's competitive advantage through the incorporation of either higher performance components or lower cost components. There is consequently a need for a transceiver line card that is flexible to support tunable lasers, enhanced system performance, or cost reduction means through easy incorporation of state of the art line optics components.

There are other limitations in the current art related to manufacturability and reliability of transceivers in optical systems. Transceivers of the prior art comprise a single large complex card with thousands of components. They must be manufactured and assembled in many stages before functional testing can be accomplished. The recognition of component failure during the late functional testing requires a complex and expensive rework process or scrapping the entire assembly. Since reliability of an entity decreases as the number of components increase, it is desirable to reduce the number of components per testable entity in the manufacturing process and in the final product. It is also desirable to make groups of these components field replaceable. There is consequently a need for a transceiver line card architecture that is functionally decomposed into a few integrated parts for manufacturability, testability, reliability, and for inventory reduction through the mix and match of the tested parts.

In the prior art, a single microcontroller and power supply is required per optical channel. The invention architecture maximizes the number of optical channels per line card to reduce cost, power, and space; and to increase channel density. For example, only a single controller and power supply are required for up to four channels.

SUMMARY

In the present invention, improvements to transceiver cards in optical transport systems in order to provide for high density, flexibility and interchangeability of functionality. The invention solves the above stated problems.

In one aspect of the invention, a high density transceiver card is taught. The high density transceiver card can support up to four duplex channels in a single unit.

In another aspect of the invention, a high density transceiver card that is flexible in the transmission standards that it supports is taught.

In another aspect of the invention, a high density transceiver card is taught that is flexible in the FEC standards that it supports is taught.

In another aspect of the invention, a transceiver line card architecture that is separated into functional modules is taught. In this aspect, the number of parts on each module is reduced from that of the prior art transceiver card in order to increase reliability. In this aspect, separation of the line optics card functions from the tributary module and tributary optics functions allows for interchangeability and flexibility to utilize different equipment and optical standards for different applications.

In another aspect of the invention, a system for and method of assembling a customized modular transceiver card is taught.

In yet another aspect of the invention, a "hot swappable" modular system is taught for a transceiver card.

In yet another aspect of the invention, a method of testing and calibrating a modular transceiver card is taught.

In yet another aspect of the invention, a method of performance monitoring system is taught for a modular transceiver card.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is an illustration of terminals in a transport system

FIG. 2 is a schematic illustration of line card modules in an architecture that is flexible in the transmission standards and FEC standards that it supports in accordance with the invention.

FIG. 3 is a graphical depiction of a tributary module and tributary optics in accordance with the invention.

FIG. 4 is a graphical depiction of a line optics module in accordance with the invention.

FIG. 5 is a flow chart of a module selection method for transceiver card assembly in accordance with the invention.

FIG. 6 is a schematic representation of the motherboard.

FIG. 7 is a graphical depiction of the mechanical RF interface between the tributary and line optics module.

FIG. 8 is a flow chart of a method of testing and calibrating a modular transceiver card for an optical transport system.

DETAILED DESCRIPTION OF ILLUSTRATIVE EMBODIMENTS

While the making and using of various embodiments of the present invention are discussed in detail below, it should be appreciated that the present invention provides many applicable inventive concepts that can be embodied in a wide variety of specific contexts. The specific embodiments described herein are merely illustrative of specific ways to make and use the invention and do not delimit the scope of the invention.

FIG. 1 shows two high density transceiver cards 100 and 150 that comprise two full duplex wavelengths of optical transport system 125. In the preferred embodiment, two full duplex channels are available. The multiple channel architecture provides sharing of microcontroller, FPGA, and power supply modules between channels. Channel 1 105 and channel 2 107 A-Z accepts client signals at the A terminal 100. The signals are converted to optical transport signals 115 and 117 for communication via optical backplane 280 to transport system 125. Transport signals 135 and 137 are received from transport system 125 are received at Z terminal 150 via optical backplane 281. Z terminal 150 demodulates the signals and regenerates original client signals as signals 155 and 157. The ZA path works similarly and allows connection between client signal 156 and 158 at the Z terminal 150 to client outputs 106 and 108 at the A terminal 100 via signals 136 and 116 and 138 and 118, respectively. DC power lines 101 and 151 consisting of redundant −48 VDC battery backed up power supplies 173 and 174 are received via electrical backplanes 170 and 171 which supply all required voltages and current at each terminal. Ethernet and discrete control signals 102 and 152 provide communications between various cards in each terminal.

Among the cards in each terminal is a high density transceiver card.

In FIG. 2 is shown a block diagram of a high density transceiver card 200 in terminal 100 that is flexible in the transmission standards and FEC standards that it supports. The high density transceiver card architecture comprises a functional arrangement of electrical, mechanical and optical components that, at a high level, provides short reach (typically less than 100 km) duplex operation with a data source such as a router or switch through the tributary optics, and also provides duplex operation with a long haul terminal, typically in a distant city. In operation data is exchanged between the data source and said long haul terminal in the distant city via optical transport system 125 that increases the distance covered by the transport system.

High density is accomplished by maximizing the line card area, the number of channels per card, and using a single microcontroller per card. The line card is housed in a terminal which is 19 inches (width) by 23 inches (depth) by about 24 inches (height). After allocation of space for backplanes, fiber management, and fans, a 16 inch by 17.5 inch area is allocated (and height of 1.3 inches) is allocated for components. In the preferred embodiment, two optical channels are placed in this area, thus increasing density. As component sizes decrease, the number of channels may be expanded with similar designs of tributary modules and line optics modules.

The transceiver card 200 is comprised of tributary optics modules 220 and 230, tributary modules 225 and 235, line optics modules 210 and 240, and motherboard 250. Transceiver card 200 is shown in relation to the optical backplane 280 and electrical backplane 170. Optical backplane 280 provides optical transport signals 115, 116, 117 and 118 between the various line cards at a terminal, as well as to the long haul transport fiber span (not shown). Electrical backplane 170 provides DC power 101 and control signal 102 between the various line cards. Transceiver card 200 is mechanically coupled to backplane 280 and 170 in order to support interchangeability of different transceiver cards via optical connector socket 260 and electrical connector 270. Tributary optical interface 201-204 functionally connects tributary optics modules 220 and 230 of the transceiver card with a data source (not shown) such as a router or a switch. In a preferred embodiment, tributary optical interface 201-204 is accomplished using a fiber optics connection, which may be either serial or parallel.

Also shown in FIG. 2 are functional interconnections between modules. Tributary optics modules 220 and 230 are functionally connected to tributary modules 225 and 235 through client interfaces 221 and 231. In the architecture of the invention, the tributary optics can be one or more optical modules 220 or 230 that support up to an aggregate 10.7 bps bandwidth. In a preferred embodiment, client interface 221 and 231 are designed in an interchangeable manner by using a multiple supplier agreement (MSA) interface such as an MSA 300 compliant interface. In a second preferred embodiment, client interfaces 221 and 231 are accomplished with 4 OC48 SONET client optical interfaces using the MSA small form factor pluggable modules (SFP). In this second embodiment tributary optics module 220 and 230 may be integrated with tributary modules 225 and 235 if improved density is required. In a third preferred embodiment client interface 221 and 231 are accomplished by using 4 or 8 1 GbE Ethernet client interfaces. In this third embodiment tributary optics module 220 and 230 may be integrated with FEC module 225 and 235 if improved density is required. In a preferred embodiment, client interface 221 and 231 are accomplished in an interchangeable manner by using a parallel optic interface such as SNAP-12. Transceiver card 200 may employ any of the client interfaces (and others not described, but known in the art) in an interchangeable manner to efficiently support a variety of client interfaces, tributary optics interfaces, data standards such as SONET, Ethernet, Generic Framing Protocol (GFP), Video, and proprietary Time Division Multiplexing (TDM). Client interfaces 221 and 231 further comprise mechanical connectivity between tributary optics module 220 and 230 and tributary modules 225 and 235 to support interchangeability of different tributary optics modules and different FEC modules. Client interface 221 and 231 mechanical connectivity can comprise of insertion under power from the front panel as in the SFP and XFP standards or integration with the tributary module as in the MSA200, MSA300, or SNAP-12 standards. Insertion under power provides modification of the client interface without adversely affecting other signal traffic.

Tributary modules 225 and 235 are functionally connected to the motherboard 250 through microwave interface 226-227 and 236-237 and electrical control interface 228 and 238. In a preferred embodiment microwave interface 226-227 and 236-237 comprise three microwave connectors that carry 10-14 Gbps serial data. The tributary module outputs 226 and 236 comprise transmitted data and transmitted clock to the motherboard 250. The tributary module inputs 227 and 237 comprises received data from the motherboard 250. A useful example of a microwave connector in this preferred embodiment is an SMP blind mating coaxial connector that allows insertion and mating of said interface from front panel without threading. Microwave interfaces 226-227 and 236-237 are mechanically connected to motherboard RF connector block 251 and 253 to support interchangeability of different tributary modules.

Partition of the line optics modules 210 and 240 from the tributary modules 225 and 235 allows changing line optics modules dependent on wavelength, output power and modulation type. In the preferred embodiment, tributary module 225 and tributary optics module 220 form a single mechanical unit that is inserted from the front side of the line card 200. Similarly, tributary module 235 and tributary optics module 220 form a single mechanical unit. Furthermore, the cards may be inserted or removed under power; i.e., they are hot swappable as will be described further. Tributary module electrical interfaces 228 and 238 are mechanically connected to the motherboard with high density electrical connectors 254 and 252. High density electrical connectors 254 and 252 are placed adjacent RF connector blocks 251 and 253, respectively. In a preferred embodiment, tributary module electrical interfaces 228 and 238 comprise microcontroller communications busses, serial communications busses, discrete control, and power (not shown). High density connectors 254 and 252 are VHDM which allows blind mating.

Tributary card insertion to the motherboard at the RF interface allows multiple client data types to be sent over a common transceiver card platform. The insertion into motherboard 250 at the interface 226, 227 and 228 allows multiple client data formats to be sent over a common platform. It also provides a design methodology for adding new interfaces. The architecture accommodates formats such as SONET where both data and timing transparency are desired. It accommodates Ethernet and other packet based formats where only data transparency is required. Also, in the case of fixed tuned DFB lasers, transceiver cards are wavelength specific. The invention accommodates the various specific wavelength by allowing transceiver card interchangeability. MSA tributary optics modules can be changed as a function of cost and distance supported (thus, also supporting interchangeability).

Motherboard microwave interfaces 251 and 253 further comprise mechanical connectivity between line optics module 210 and 240 and motherboard 250 to support interchangeability of different line optics modules. The functional connection consists of transmit-receive pairs 214-215 and 244-245. Line optics modules 210 and 240 are functionally connected to optical backplane 280 through line optical interface 260. In a preferred embodiment, line optical interface 260 consists of the transmit-receive pairs 211-212 and 241-242 for the line optics modules 210 and 240. An individual ribbon connector plug containing 211 and 212 mechanically attaches to a single position of a four-position fiber optic ribbon connector 260 to accomplish connection of the transmit-receive pairs. A useful example of this type of connector is the HBMT which has four sockets that mate with four individual 8 or 12 fiber ribbons and each ribbon can easily accommodate the transmit-receive pairs. Line optical interface 260 further comprises mechanical connectivity for signals 115-118 between motherboard 250 and optical backplane 280 to support interchangeability of different transceiver cards 200 and different optical backplanes. Electrical interfaces 255 and 256 provide serial communication and discrete control between motherboard 250 and line optics modules 210 and 240 via signals 213 and 243.

In FIG. 3 is shown a block diagram of the tributary module 225, and tributary optics module 220. Tributary module 235 and tributary optics module 230 are similar and a description will not be offered for brevity. Tributary optics module 220 receives the client optical signal 201 and converts to electrical signal 311. Signals 311, 312 and 313 are included in signal 221 of FIG. 2. An inline SERDES 320 converts the client serial data (at rate shown in Table 1, column 3) to parallel data (at the rate shown in Table 1, column 4), if required.

Table 1 shows why the Line Card 200 is optimally partitioned at the output of the line side SERDES. The input formats may require different MSA standard modules ranging from 300 pin MSA transponders, SFP, XFP, or parallel optics. Depending on selection of the optical module, a client side SERDES may or may not be required. Depending on the number of input signals and their data rates, a mapping device to the 16 bit SFI-4 FEC interface may or may not be required. The SERDES 320 is required when either MSA module 220 does not have built-in SERDES 320 or client data rate is above 650 mbps. The PM/mapping device 330 is required when either performance monitoring is not provided in the FEC or SERDES; or when the client interface (Table 1, column 4) and FEC interface (Table 1, column 5) are different (e.g., 4.times.GBE); or timing transparency is required as in the 4.times.OC-48 Type B tributary module. The FEC 16-bit, SFI-4 interface can operate at clock rates of up to 650 MHz. The input and output clock rates have to be selected to match the data format as shown in Table 1. Therefore, everything from the MSA module to the line-side SERDES module is subject to change depending on the client interface requirements. Therefore, a partition at the line-side SERDES (350 and 360) is optimal and allows change of client interfaces without affecting the rest of the system.

There are three types of tributary interfaces for transparent transport of client data. The type A tributary module has a client interface of about 10 Gbps and therefore no aggregation takes place. These interfaces are shown in the first two rows of the table as OC192, and 10 GBE. The type B module is for transparent SONET aggregation with data rates of less than 2.5 Gbps aggregated onto the 10 Gbps optical transport path. An example of a 4.times.OC-48 module is shown that provides both data and timing transparency for plesiochronous aggregation. The type C cards are for aggregation of packet-based data communications standards on to the 10 Gbps channel. These cards use data communications standards such as Ethernet and Fiber Channel. Idle characters are inserted in the absence of packets. They only require data transparency but not timing transparency since idle characters can be added or removed to achieve packet transparency. The partition at the line-side SERDES allows tributary card designs that accommodate all three data types.

interface 321 (Table 1 column 5). The performance monitor block 330 collects PM data for SONET or packet-based (Ethernet, Fiber Channel) signals and ensures that the signals are received error-free from the client. The PM/mapping device 330 also transmits parallel client data (Table 1, Column 4) to the FEC 340 through interface 331 (Table 1, Column 5). In other preferred embodiments, PM/mapping device 330 may include one or more FPGA devices or ASICs. In one preferred embodiment, the FEC 340 encapsulates the signal with a 25% overhead Reed-Solomon/BCH concatenated code at the FEC output rate (Table 1 column 6). The output signal 341 has a data rate that is 1.25 times the input data rate. In another preferred embodiment, a seven percent overhead can be used such as the G.709 ITU standard. Signal 341 is input to the serializer 350. Serializer 350 converts the data from parallel to serial at FEC transport rate shown in Table 1 column 7. This is typically about 12.5 Gbps. The data and clock signals 226 are output to the RF connector block 251.

Given that the interface between the line optics modules 210 and 240 and the tributary modules 225 and 235 electrically occur at the line side SERDES 350/360, and physically occur at connector blocks 251 and 253 where the signal frequencies of the signals 214, 215, 226, 227, 236, 237, 244, 245 correspond to Table 1, column 7, the broadband capability (as will be further described) of the line optics modules 210 and 240 enable a wide variety of tributary modules and client interfaces on the same transceiver line card 200 which is a significant advantage over the current art.

Received signals 227, which also may perform the clock and data recovering function from the motherboard 250 are converted from serial to parallel at the deserializer 360. The parallel signal is input to the FEC 340 via signal 361. FEC 340 detects and corrects errors in the transmission. The FEC output signal 332 is sent to the MSA 220 by way of signal 332, PM/mapping device 330 (if required), signal 322, and SERDES 320 (if required). SERDES 320 serializes the transmission and sends it to tributary optics module 220 via signal 312. Tributary optics module 220 translates the signal back to the optical domain at 202.

The FEC FPGA 335 enables control of the card from the motherboard 250 which houses the microcontroller 650 and software. FEC FPGA 335 is connected to motherboard 350 via VHDM 252. Signals 354, 382 and 383 are contained in signal 228 (as shown on FIG. 2) in relation to VHDM 252. The cpu_bus 382 is passed through FPGA 335 to line 333 to the FEC 340 and PM device 330. The cpu_bus accesses

TABLE 1

The tributary card maps client interfaces to line side transport signals as shown.

| Format | Card Type | Client Serial Rate (Gbps) | Client Parallel Data Rate (MHz) | FEC Input Rate (MHz) | FEC Output Rate (Gbps) 25% Overhead | Line Rate (Gbps) |
|---|---|---|---|---|---|---|
| OC192 | A | 9.953 | 16 × 622.08 | 16 × 622.08 | 16 × 777.6 | 12.44 |
| 10GBE | A | 10.3125 | 16 × 644.531 | 16 × 644.531 | 16 × 805.5 | 12.9 |
| 4 × OC-48 | B | 2.488 * 4 | 16 × 622.08 | 16 × 622.08 | 16 × 777.6 | 12.44 |
| 4 × GBE | C | 1.25 | 4 × 10 × 125.00 | 16 × 625.00 | 16 × 781 | 12.5 |
| 8 × GBE | C | 1.25 | 8 × 10 × 125.00 | 16 × 625.00 | 16 × 781 | 12.5 |
| 8 × GFC | C | 1.0625 | TBD | TBD | TBD | TBD |
| 16 × OC-12 | B | 622.08 | 16 × 622.08 | 16 × 622.08 | 16 × 777.6 | 12.44 |

Returning to FIG. 3, the SERDES 320 is required when either the MSA module does not have a built in SERDES as in the SFP or when the client data rate is above 650 Mbps. An in-line performance monitoring/mapping device 330 is placed to translate the SERDES output to the FEC SFI-4 registers in these devices to configure and obtain status. The serial communications bus 383 arrives from the motherboard 250 to enable FPGA programming for serial communications with temperature sensors 395 and PMD 330. The FEC FPGA programs the serializer 350, deserializer 360, and threshold control 365 through connection 381 so that the transport signals are generated and received accurately. The power sequencer 370 distributes voltages from the motherboard and controls the power sequencing requirements for the card. Serial control line 313 between the FEC FPGA 335 and tributary optics module 220 serves to monitor various MSA parameters and alarms. The EEPROM 385 shares connection 382 with the cpu_bus and stores card configuration and calibration data allowing for independent assembly and calibration of tributary module units.

In one embodiment, the timing subsystem 380 tracks the input signal 332 and generates an error signal 376 to generate recovered clock 375. The recovered clock(s) 375 are used as a reference to provide timing for output signal 322. In a second embodiment, the timing subsystem 380 generates a fixed reference 375 for output signal 322.

FEC 340 has a built in pseudo random bit sequence (PRBS) generator and checker for test purposes. This feature is used in the system to verify the quality of the communications link prior to sending traffic. Prior to allowing traffic, the bit error rate for each channel is measured. If the BER is more than what the FEC can correct, then the channel is not provisioned. This method of measuring PRBS to verify the quality of the communications link allows channel verification without external test equipment.

The tributary module can support neighbor discovery protocols used to determine network topology. The PM device(s) 330 can be used to implement packet over SONET neighbor discovery. The FEC device 340 can be used to support JO/DCC neighbor discovery for OC192. In another embodiment, the SERDES device can be used for JO/DCC neighbor discovery.

FIG. 7B shows the RF connector block interface 251 on the motherboard 250. An identical RF connector block is found at 253. As shown in FIG. 7A, the RF connector block 251 mechanically resides on the motherboard and provides a blind mating interface to RF connectors 705, 710, and 715 (which in the preferred embodiment are SMP female-female adapters) on the tributary module 225. They engage with an SMP male edge-mount connectors on the tributary card PWB (printed wiring board) of the tributary module 225 with a full detent 10 lb force that secures them to the tributary module 225. The RF connector block receptacle (SMP-male) has no detent and is held in place with mechanical alignment thus accomplishing blind mating microwave electrical connection. Signal 214 is passed through as signal 227. Signal 226 is passed through as 215. Custom SMP to SMA cable assemblies 730, 740, and 750 provide the connection between the motherboard 250, RF connector 251 and line optics module 210.

In FIG. 4 is a schematic representation of line optics module 210. Line optics module 240 is identical except that the laser 410 operates at a different wavelength. Line optics module 210 comprises photoreceiver 430, receiver electronic amplifier 432 and electronic low pass filter 434. Together photoreceiver 430, receiver electronic amplifier 432 and electronic low pass filter 434 constitute the receiving part of line optics module 210. An incoming optical data signal is received via signal 212 from optical connector 260. In a preferred embodiment, photoreceiver 430 is realized by a semiconductor photodetector, and converts received optical data into high speed electrical signals. In a preferred embodiment, receiver electronic amplifier may be realized by a stripline RF FET amplifier. In a preferred embodiment, electronic low pass filter 434 may be realized by stripline RF capacitors and RF inductors. Receiver electronic amplifier 432 amplifies said high speed electrical signals, and electronic low pass filter 434 rejects high frequency components that disproportionately contribute to noise. The output of low pass filter 434 is signal 214.

Line optics module 210 further comprises data driver 420 and clock driver 422. In a preferred embodiment data driver 420 is realized by RF power electronics in a stripline package. In a preferred embodiment, clock driver 422 is realized by RF power electronics in a stripline package. Data driver 420 and clock driver 422 are connected to RF connector block 251. They receive data signals 433 and clock signal 435 from the motherboard (shown combined as signal 215 on FIG. 2). The clock driver 422 is narrowband and enables transmission between 8 Gbps and 13.5 Gbps. The data driver 420 is broadband and enables transmission up to 13.5 Gbps. The combination enables transmission of the optical signal 415 with bandwidths up to 13.5 Gbps.

Line optics module 210 further comprises laser 410, RZ modulator section 412, NRZ modulator section 414 and optical splitter 416. Laser 410 is realized by an ITU grid compliant semiconductor laser. RZ modulator section 412 and NRZ modulator 414 are realized using lithium niobate modulators. In another embodiment RZ modulator section 412 and NRZ modulator 414 are realized electro-absorptive semiconductor modulators. Optical splitter 416 is realized using a 2% optical decoupler and is used to generate feedback control signals for the RZ and NRZ demodulators 442 and 444.

Laser 410 provides a carrier signal modulated by RZ modulator section 412 and NRZ modulator section 414 and exits through optical splitter 416 as signal 211. The bandwidth of the output signal 211 is a function of RZ modulator 412, NRZ modulator 414, clock driver 422, and data driver 420. In the preferred embodiment, the RZ modulator 412 and NRZ modulator 414 are broadband enabling transmission of signals 215 with bandwidth up to 13.5 Gbps. One skilled in the art can adjust bandwidths of 412, 414, 420 and 422 to accommodate other bandwidths broader or narrower.

Signal 211 enters optical connector 260. In particular, NRZ modulator section 414 encodes the data traffic onto the carrier. RZ modulator section 412, provides enhanced OSNR performance for ultra long haul transport application.

Laser 410 current and temperature are set via bus 490 at a specified wavelength and power. Typically, monitor photodiodes in the laser assembly 410 provide multiple outputs to monitor power and wavelength. For example, a laser with integrated wavelength locker may output two voltages: the sum of the output voltages may provide an indication of power and the ratio of output voltages may indicate wavelength error for one laser type. For another laser type, one voltage may indicate power alone and one or more separate voltages may be used to indicate and/or control wavelength. There are several different types of lasers with different external interfaces corresponding to different methods and different accuracies in wavelength control. Thus, the preferred embodiment has the capability of implementing laser control in software via signals 490, control block 440 and microcontroller 650 allowing for change of laser type and control algorithm on the line optics module with just software changes.

Control block 440 orchestrates the functions of line optics module 210 according to instructions from microcontroller 650 via signal bus 213 and signal bus 490. Control block 440 comprises analog to digital converters, switches, digital to analog converters, and an EEPROM. The EEPROM is used to store the card configuration and calibration values that are determined during the initial testing of the card. The EEPROM in 440 also stores the clock driver 422 phase for every tributary module 225 and is a function of the line rate (Table 1, column 7). Software reads the card type from the EEPROM 385 and configures clock driver phase 427 from the control block 440. The digital to analog converters configure the laser 410 and the clock and data drivers, 420 and 422, and receive amplifier 432. The analog to digital converter monitors the laser 410 operational parameters and clock and data driver (420 and 422) output voltages, and the various bias voltages in the bias circuitry 442 and 444.

Control block 440 configures receive amplifier 432 to generate a constant output voltage at 214. The clock driver 422 and data driver 420 drive levels 423 and 421, which are optimally set to the RF V.pi. voltage of the modulator stages 412 and 414. The clock signal 423 phase is adjusted such that 421 and 423 are in phase. This results in a high fidelity RZ signal at 211 provided modulators 412 and 414 are biased at quadrature.

The bias circuitry 442 and 444 biases modulators 412 and 414, respectively, at quadrature. Bias circuit 444 generates a low frequency AM dither signal 445 (typically 10 kHz) that modulates on data amplifier 420. The modulation appears on signal 413 which is input to NRZ modulator 414. Modulator 414 combines the signal from the RZ modulator and the low frequency modulated data signal 421 into a RZ signal 415. Splitter 416 couples optical signal 415 into photodector and bandpass filter 446 where the dither signal is detected and filtered. Detected signal 447 is sent to a synchronous demodulator circuit 444 that adjusts bias 413 until dither signal 445 and detected signal 447 are in phase; when the phase error is zero, the modulator is biased at quadrature. Similarly, the RZ stage 412 bias voltage 411 is set at quadrature with dither signal 443 (typically 20 kHz) via detection and filter signal 448 and demodulator 442. Control block 440 monitors bias signals 411 and 413 via bias devices 442 and 444 and communicates this to microcontroller 650 via signals 213.

The motherboard 250 is shown in FIG. 6. It provides power, command and control, and status monitoring for the Line Card. Microcontroller island 650 is a pluggable, modular assembly that resides on the motherboard 250 and contains the CPU. Software resides on the microcontroller island 650 and controls the line card. High density backplane connector 270 provides the electrical interface to the electrical backplane. In preferred embodiment, this interface consists of Ethernet, −48 VDC power and return, and discrete control signals over a high density connector such as HDM. A multi-position optical socket connector 260 provides the optical interface to the optical backplane and receives optical signals 115-118 from optical backplane 280. An example of such a connector is HBMT which can in the preferred embodiment have four positions to expand to 4 optical channels per transceiver card. The HBMT pigtail from each LOM plugs into a single position in the socket. VHDM connectors 252 and 254 provide the electrical interface to the tributary cards.

DC power 671 from the electrical backplane is provided with a −48 VDC connection from the HDM connector 270. This is converted to the required voltages via DC-DC converters located in the power section 630 and distributed to the tributary cards 225 and 235 via lines 633 and 634, and line optics modules 210 and 240 via lines 631 and 632. The card is designed to provide and thermally accommodate 250 W of power consumption for future expansion.

Power section 630 also provides power to microcontroller 650 via 635.

The HDM interface also provides communications with the ICM management card for the transport system. The communications interface 672 comprises an Ethernet bus, all_good signal, card presence indicator, and reset signal. The card presence is detected and is initialized from the ICM at start-up. The card provides an all_good signal to the ICM so that in the event of a communications failure, the ICM does not RESET the card and affect traffic if the failure is not traffic affecting. In the event of traffic affecting failures, the card is RESET to see if it recovers from the failure.

Microcontroller island 650 controls tributary card 225 and 230 via signal bus 652 and isolation switch 640. Signal bus 652 comprises cpu_bus (microprocessor bus) and serial busses which are passed through the isolation switch 640 to signal busses 641-644. Signal 641 and 643 are the cpu_bus subsets from 652 to tributary card 225 via signal bus 228 and 238. Signals 642 and 644 comprise the serial bus subsets from 652 to tributary card 225 and 235 via signals 228 and 238. In the preferred embodiment, serial busses comprise SPI, I2C, and FPGA program bus. The serial bus provides communications with temperature sensors 395, MSA tributary optics 220 via FEC FPGA 335, and provides remote programming of FPGAs 335 and 330 from software. Microcontroller island 650 controls line optics modules 210 and 240 via signals 651 which passes through FPGA 620 to signal 621 and signal 622. Signals 213 comprise control signal bus 621 and power 631 for line optics 210. Similarly, 243 comprises control signal bus 622 and power 632.

A structured performance monitoring process continually monitors the status of tributary modules 225 and 235, and line optics modules 210 and 240 from microcontroller 650. Tributary optics modules 220 and 230, optical receive power, optical transmit power, laser current and temperature are monitored via 383 and 313. Client data is monitored via PM device 330 (10 GPE), FEC 340 (OC192) or SERDES 320 (OC48) in this embodiment. The PM statistics are collected per SONET and Ethernet standards that are widely known. The line optics modules 210 and 240 are monitored via 213 to ensure the signal 415 is at the correct wavelength and power; verify modulator bias 411 and 413 at quadrature; and verify modulator drive levels 421 and 423 are set optimally. It also verifies that the optical signal 212 is received with specified input power and generates specified output voltage at 214.

A combination of staged VHDM connectors 252 and 254 and isolation switches 640 allow tributary modules 225 and 235 insertion and removal under power. The VHDM connector 252 and 254 presence pin is shorter than power and signal pins. Thus, during engagement, presence is sensed only after power and signals have engaged with tributary module 225 and 235. Similarly, upon removal, absence is detected prior to removal of tributary module 225 and 230. The isolation switches 640 isolate signals 652 and 641-642 when tributary module 225 is removed. Similarly, 652 and 643-644 are isolated when tributary module 235 is removed. In this way, the tributary modules are independently hot-swappable.

FIG. 5 is a flow chart illustrating a method of module selection for customized transceiver card assembly in accordance with another aspect of the invention. The method allows the design of a customized transceiver card 102. The method comprises a first step 810 of selecting the necessary FEC coding gain. In a preferred embodiment the choices include 9.4 dB coding gain with a 25% overhead (for a transmission line rate of 12.5 Gbps), 6 dB coding gain with a 7% overhead, or 10 dB coding gain with 25% overhead. Additionally, a digital wrapper may be selected with 7% overhead. Note that these choices are not restrictive; the invention will accommodate FEC devices with improved coding gain at the lower overhead rates when they become available. The method further comprises a second step 812 of selecting the desired 10 Gbps client interface. In a preferred embodiment the choices include OC192 SONET/SDH, 10 GbE Ethernet, 4.times.OC48 SONET/SDH, 10.times.1 GbE Ethernet, time division multiplexed interface, or some other interface with a data rate less than or equal to 10 Gbps. The method further comprises a third step 814 of selecting the appropriate line optics modulation. In a preferred embodiment, the choices are optical return-to-zero (RZ), electrical RZ, non-return-to-zero (NRZ) or some other line optics modulation format. These selections allow the correct mix of modules in a customized transceiver card 200.

In FIG. 8 is shown a flow chart of a method for testing and calibrating modular components. At step 910, an interlocking modular transceiver card is provided. The modular transceiver card in the preferred embodiment has two line optics modules 210 and 240, two tributary optics modules 220 and 230, two tributary modules 225 and 235, and a motherboard 250.

At step 920, each of the individual modules is tested for functionality. At 930, each of the individual modules is calibrated and operational data is stored in onboard memory. In the preferred embodiment, each of the modules has a separate EEPROM memory in which the operational data is contained, step 940. At step 950, the modular transceiver modules are assembled into a single transceiver card for insertion in a terminal of a transport system 125.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for verifying the quality of a communications link, comprising:
    measuring a bit error rate of each channel in the communications link using a pseudo random bit sequence, the communications link comprising at least one channel;
    determining a highest bit error rate for which a forward error correction standard can correct; and
    provisioning each channel in the communications link which has a measured bit error rate which is not higher than the highest bit error rate.

2. The method of claim 1, further comprising:
    encoding at least one signal propagating along the communications link according to the forward error correction standard.

3. The method of claim 1, wherein the measuring the bit error rate of each channel comprises measuring the bit error rate of each channel prior to propagating data traffic along the communication link.

4. The method of claim 3, wherein the determining the highest bit error rate comprises determining the highest bit error rate prior to propagating the data traffic along the communication link.

5. The method of claim 4, wherein the provisioning comprises provisioning each channel in the communications link which has a measured bit error rate which is not higher than the highest bit error rate prior to propagating the data traffic along the communication link.

6. The method of claim 1, wherein the measuring comprises measuring, in a tributary module, the bit error rate of each channel in the communications link without the use of test equipment that is external to the tributary module.

7. The method of claim 1, wherein the measuring comprises generating the pseudo random bit sequence with a pseudo random bit sequence generator, wherein a tributary module comprises the pseudo random bit sequence generator.

8. The method of claim 7, wherein the measuring comprises checking the pseudo random bit sequence with a pseudo random bit sequence checker, wherein the tributary module comprises the pseudo random bit sequence checker.

9. A tributary module for verifying the quality of a communications link, the tributary module comprising:
    a communications link comprising at least one channel; and
    a forward error correction module configured to encode at least one signal propagating along the communications link using a forward error correction standard;
    wherein the tributary module is configured to:
        measure a bit error rate of each channel in the communications link using a pseudo random bit sequence,
        determine a highest bit error rate for which a forward error correction of the communications link can correct, and
        provision each channel in the communications link which has a measured bit error rate which is not higher than the highest bit error rate.

10. The tributary module of claim 9, further comprising:
    a pseudo random bit sequence generator configured to generate the pseudo random bit sequence.

11. The tributary module of claim 10, further comprising:
    a pseudo random bit sequence checker configured to check the pseudo random bit sequence.

12. The tributary module of claim 9, wherein the tributary module is further configured to measure the bit error rate, determine the highest bit error rate, and provision each channel in the communications link which has a measured bit error rate which is not higher than the highest bit error rate prior to propagating data traffic along the communications link.

13. The tributary module of claim 9, wherein the tributary module is further configured to measure the bit error rate of each channel in the communications link without the use of test equipment that is external to the tributary module.

14. A tributary module for verifying the quality of a communications link without the use of test equipment external to the tributary module, the tributary module comprising:
    means for measuring the bit error rate of each channel in the communications link using a pseudo random bit sequence;
    means for determining a highest bit error rate for which a forward error correction standard can correct; and
    means for provisioning each channel in the communications link which has a measured bit error rate which is not higher than the highest bit error rate.

15. The tributary module of claim 14, further comprising:
    means for generating the pseudo random bit sequence.

16. The tributary module of claim 15, further comprising:
    means for checking the pseudo random bit sequence.

17. The tributary module of claim 14, further comprising:
    means for encoding at least one signal propagating along the communications link according to the forward error correction standard.

* * * * *

UNITED STATES PATENT AND TRADEMARK OFFICE
CERTIFICATE OF CORRECTION

PATENT NO. : 8,155,519 B2
APPLICATION NO. : 12/764617
DATED : April 10, 2012
INVENTOR(S) : Sheth et al.

Page 1 of 1

It is certified that error appears in the above-identified patent and that said Letters Patent is hereby corrected as shown below:

In Column 2, Line 13, delete "30 100 km" and insert -- 30-100 km --, therefor.

In Column 3, Line 59, delete "system" and insert -- system. --, therefor.

In Column 11, Line 12, delete "V.pi." and insert -- $V\pi$ --, therefor.

In Column 11, Line 24, delete "photodector" and insert -- photodetector --, therefor.

In Column 12, Line 67, delete "4.times.OC48 SONET/SDH, 10.times.1" and insert -- 4×OC48 SONET/SDH, 10×1 --, therefor.

Signed and Sealed this
Eleventh Day of September, 2012

David J. Kappos
*Director of the United States Patent and Trademark Office*